United States Patent [19]
Chiu et al.

[11] Patent Number: 5,329,411
[45] Date of Patent: *Jul. 12, 1994

[54] CASSETTE LOADING APPARATUS WITH REDUCED SPACE REQUIREMENT FOR LOADING A MAGNETIC RECORDING CASSETTE INTO A CASSETTE PLAYING OR RECORDING APPARATUS

[75] Inventors: Ming-Che Chiu; Chyi-Fwu Chiou; Wen-Don Lin, all of Chutung Hsinchu, Taiwan

[73] Assignee: Industrial Technology Research Institute, Chutung Hsinchu, Taiwan

[*] Notice: The portion of the term of this patent subsequent to Feb. 24, 2011 has been disclaimed.

[21] Appl. No.: 986,128

[22] Filed: Dec. 4, 1992

[51] Int. Cl.⁵ .................... G11B 15/675; G11B 15/60
[52] U.S. Cl. ...................... 360/96.5; 360/96.6
[58] Field of Search ............ 360/96.5, 96.6; 369/75.1, 77.1, 77.2

[56] References Cited

U.S. PATENT DOCUMENTS

| | | | |
|---|---|---|---|
| 4,688,122 | 8/1987 | Takai et al. | 360/96.5 |
| 4,734,800 | 3/1988 | Suzuki | 360/96.5 |
| 4,752,048 | 6/1988 | Paik | 360/96.5 |
| 4,752,844 | 6/1988 | Suzuki | 360/96.5 |

*Primary Examiner*—Stuart S. Levy
*Assistant Examiner*—George J. Letscher
*Attorney, Agent, or Firm*—W. Wayne Liauh

[57] ABSTRACT

A cassette loading mechanism comprising a movable plate-like member which is maintained on the same plane with a stationary plate-like member and slidable relative to the stationary member. A symmetrical four bar linkage is connected between the two members. The movable member is moved, under the guidance of fixed shaped slots, with a cassette holder into which a cassette is inserted between an unloading position and a loading position by an actuation device acting at one side of the cassette holder. The four bar linkage transmits the actuation to the other side of the cassette holder in a substantially synchronous way to make both sides of the cassette holder move symmetrically and synchronously and thus reducing the risk of jamming.

2 Claims, 13 Drawing Sheets

CASSETTE LOADING APPARATUS WITH REDUCED SPACE REQUIREMENT FOR LOADING A MAGNETIC RECORDING CASSETTE INTO A CASSETTE PLAYING OR RECORDING APPARATUS

FIELD OF THE INVENTION

The present invention relates generally to a cassette loading mechanism for a magnetic recording apparatus wherein a cassette having a magnetic recording media, such as a tape, wound on the reels thereof is loaded into a playing deck to have the reel hubs engaged and driven by driving axles thereof.

BACKGROUND OF THE INVENTION

Some of the currently available magnetic recording devices comprise a cassette loading mechanism which is driven only at a single side thereof due to the limitation in space arrangement, which cassette loading mechanism provides a loading kinematic action to only one side of the cassette to be loaded. This may induce an instable loading operation if the opposite side of the cassette is subjected to friction or other resistance in moving in the loading route.

To address the instability problem, another type of prior art cassette loading mechanism adopts gear trains arranged substantially symmetrical about the cassette to be loaded to provide a symmetrical loading movement at both sides of the cassette. The principal disadvantage of this type prior art arrangement is that in order to avoid interference with the operation of recording or re-playing of the apparatus, the gear trains and the related mechanism have to be disposed close to the top side or bottom side of the recording apparatus housing. This inevitably expands the size or volume of the recording apparatus, and is also in conflict with the world trend of miniaturization for home appliances.

It is therefore desirable to provide a cassette loading mechanism which is a single side driven mechanism but adopts a symmetrical linkage to act upon the opposite side simultaneously so as to overcome the problem of instability while not substantially increasing the overall size thereof.

OBJECTS OF THE INVENTION

It is the principle object of the present invention to provide a cassette loading mechanism comprising basically thin flat members closely disposed around a cassette playing deck which defines a space to receive therein the cassette so as to reduce the space occupied by the cassette loading mechanism.

It is another object of the present invention to provide a cassette loading mechanism comprising a symmetrical four bar linkage which transmits motions occurring at one side of the cassette loading mechanism to the other side thereof in a substantially synchronous way so as to move the cassette in a substantially symmetrical way during loading or unloading operations.

To achieve the above-mentioned object, there is provided a cassette loading mechanism comprising a movable plate-like member which is maintained on the same plane with a stationary plate-like member and slidable relative to the stationary member. A symmetrical four bar linkage is connected between the two members. The movable member is moved, under the guidance of fixed shaped slots, with a cassette holder into which a cassette is inserted between an unloading position and a loading position by an actuation device acting at one side of the cassette holder. The four bar linkage transmits the actuation to the other side of the cassette holder in a substantially synchronous way to make both sides of the cassette holder move symmetrically and synchronously and thus reducing the risk of jamming.

Other objects and advantages of the invention will be apparent from the following description of a preferred embodiment taken in connection with the attached drawings, in which:

DETAILED DESCRIPTION OF THE PREFERRED EMBODIMENT

Figure 1:
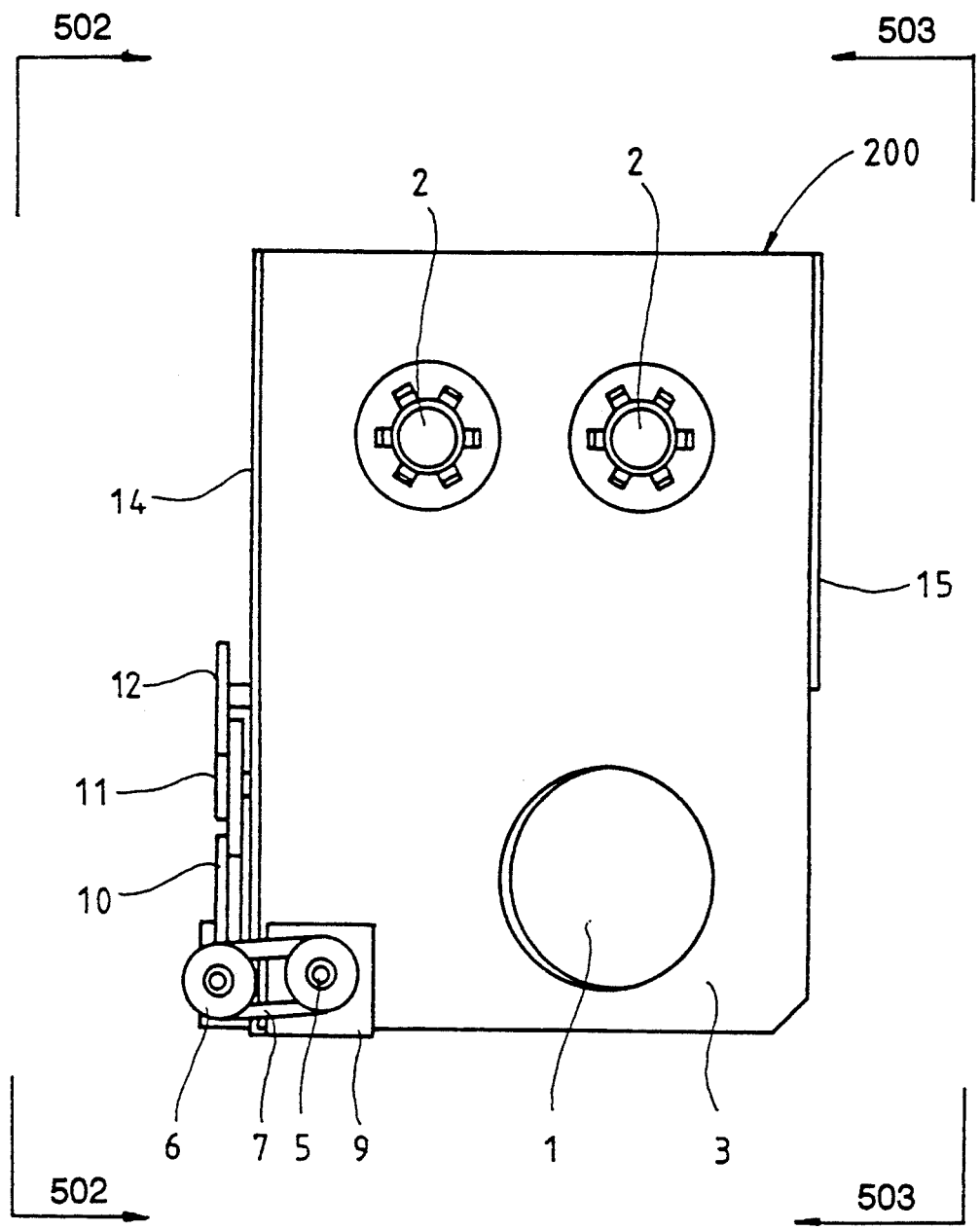
FIG. 1 is a top plan view of a cassette loading apparatus made in accordance with the present invention with a major portion of the cassette loading mechanism being removed for showing the cassette playing deck and the relation thereof with the cassette loading mechanism.
Figure 2:
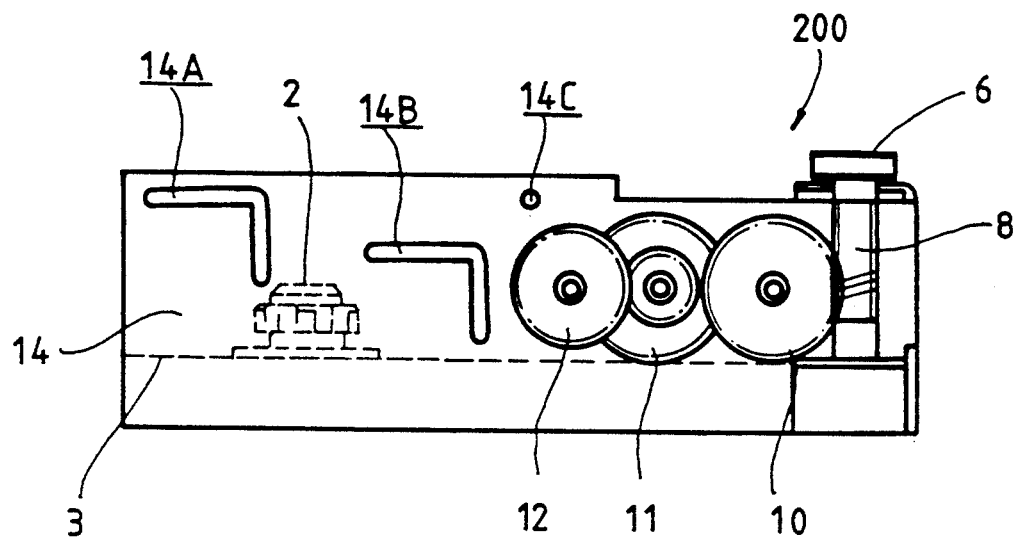
FIG. 2 is a side elevational view taken along the line 2—2 of FIG. 1.
Figure 3:
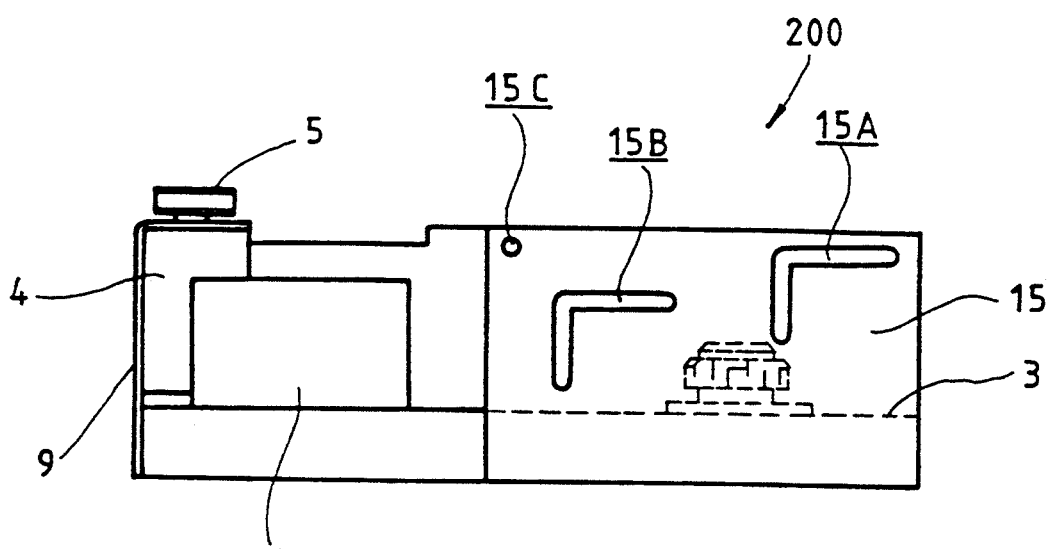
FIG. 3 is a side elevational view taken along the line 3—3 of FIG. 1.
Figure 4:
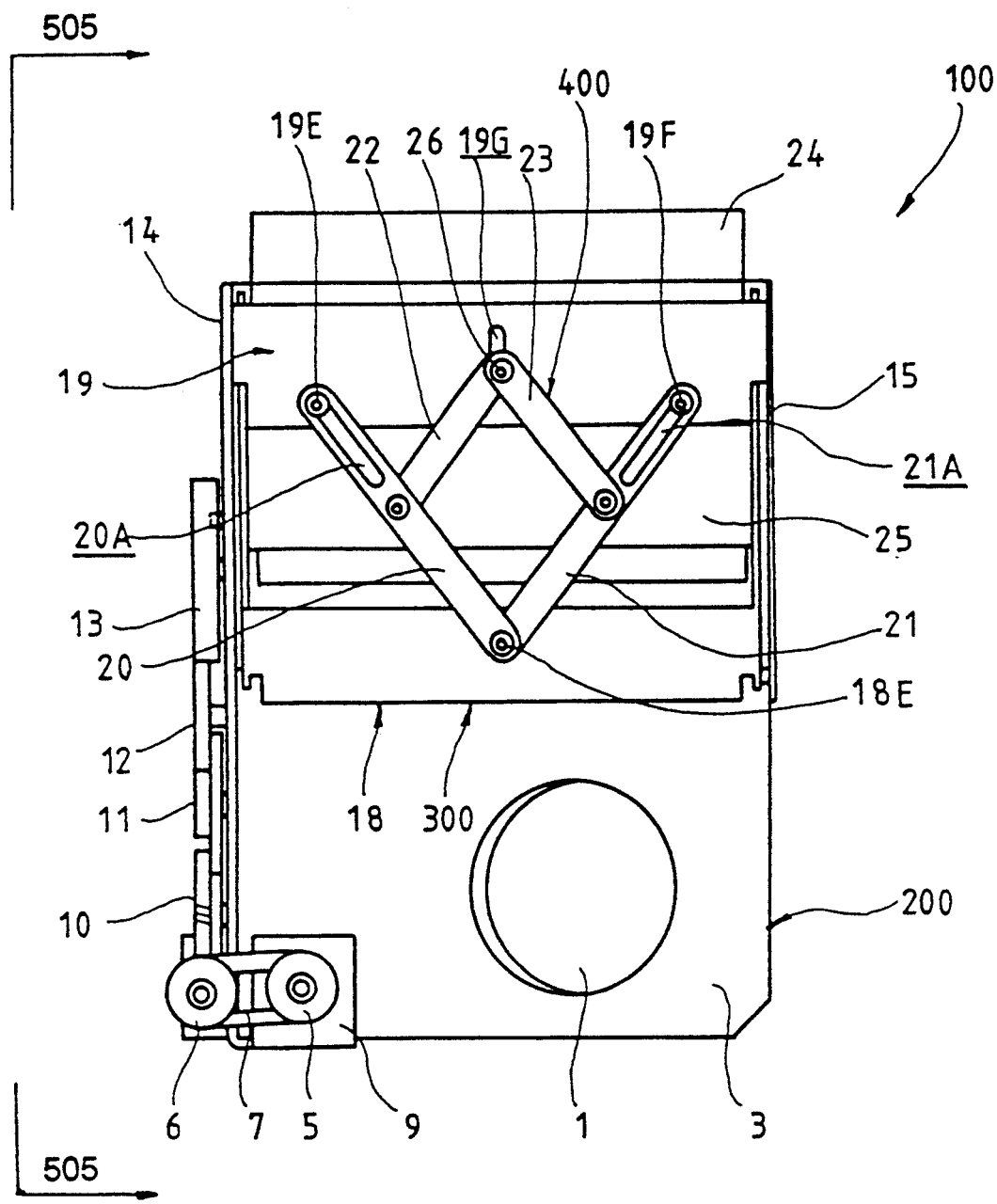
FIG. 4 is a top plan view of the cassette loading apparatus made in accordance with the present invention.
Figure 5:
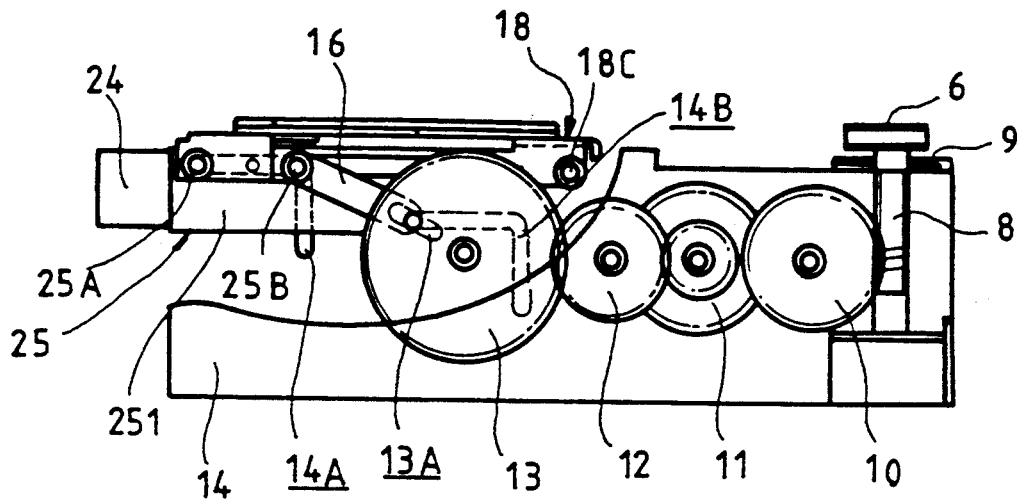
FIG. 5 is a side elevational view taken along the line 5—5 of FIG. 4.

With reference to the drawings and in particular to FIGS. 1-5, wherein a cassette playing apparatus broadly illustrated at 100 is shown, the cassette playing apparatus 100 comprises a playing deck 200 (FIGS. 1 and 2) which has a bottom member 3 with a first side plate 14 and a second side plate 15 perpendicularly mounted thereon on opposite side edges of the bottom member 3. As is usually known, magnetic recording media driving axles 2 and magnetic drum means 1 are provided on the bottom member 3 to drive the recording media contained in a cassette 24 (see FIGS. 4 and 5) and to receive magnetic signals from the recording media. This construction is well known to those skilled in the art and not a subject of the present invention so that no further detail will be given herein.

A cassette holder 25 which receives the cassette 24 therein is movably disposed within the playing deck 200 to move the cassette 24 from an unloading position where the cassette holder 25 is ready for receiving the cassette 24 to a loading position where the cassette holder 25 is substantially located on the bottom member 3 and thus the reel hubs (not shown) of the recording medium fit over the axles 2 to be driven thereby.

The cassette holder 25 is mechanically connected to a torque source, preferably a motor 4 (see FIG. 3) secured on a motor support 9 via a cassette loading mechanism of the present invention, broadly illustrated at 300, and a reduction gear train, including a plurality of gears 10, 11, 12 and an output gear 13. Other mechanical elements, such as pulleys 5, 6 and a belt 7 connected therebetween and a worm 8, can also be included. This is not a subject of the present invention and thus will not be further discussed.

Figure 6:
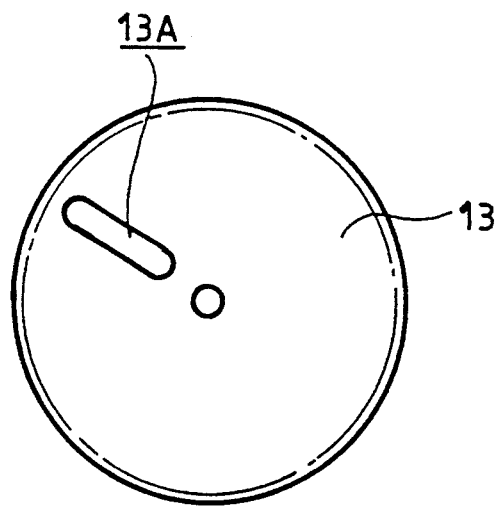
FIG. 6 is a plan view showing a slotted gear used in the present cassette loading mechanism to actuate the cassette holder which is to be loaded into the playing deck by the loading mechanism.

All members of the gear train are rotatably mounted on the first side plate 14 of the playing deck 200. The output gear 13 has a radial slot 13A formed thereon, as best illustrated in FIG. 6.

On the first side plate 14 of the playing deck 200, two L-shaped slots 14A, 14B are formed. Similarly, two L-shaped slots 15A, 15B are formed on the second side plates 15 of the playing deck 200 just opposite to the slots 14A, 14B of the first side plate 14. Each of these L-shaped slots 14A, 14B, 15A, 15B comprises a horizontal section and a vertical section. The cassette holder 25 has two opposite lateral sides (also referred to as first lateral side and second lateral side) 251, 252 on which a first pair of side rods 25A, 25C (also see FIGS. 12-20) are respectively formed and extend into the first L-shaped slot 14A of the first side plate 14 and the first L-shaped slot 15A of the second side plate 15 to be slidably movable therein. The cassette holder 25 also has a second pair of side rods 25B, 25D (also see FIGS. 12-20) respectively formed on the two opposite lateral sides 251, 252 thereof and extending into the second L-shaped slot 14B of the first side plate 14 and the second L-shaped slot 15B of the second side plate 15.

The second side rod 25B formed on the first lateral side 251 of the cassette holder 25 further extends into the slot 13A of the output gear 13 to be guided thereby so that when the second side rod 25B is moved by the rotation of the output gear 13, it is forced to move along the second L-shaped slot 14B of the first side plate 14.

Figure 9:
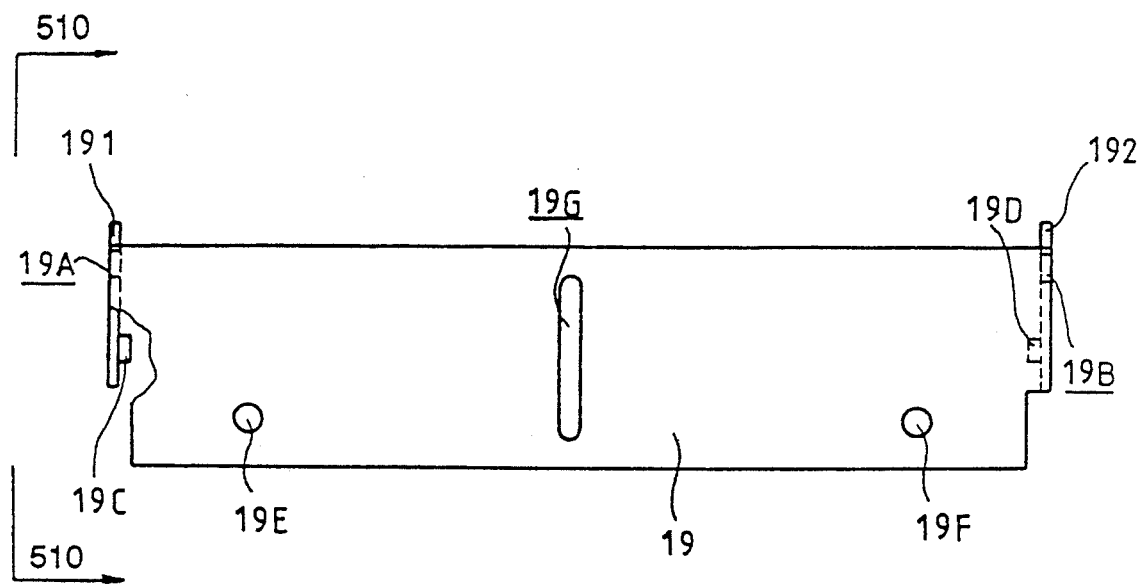
FIG. 9 is a top plan view of the movable member of the cassette loading mechanism.
Figure 10:
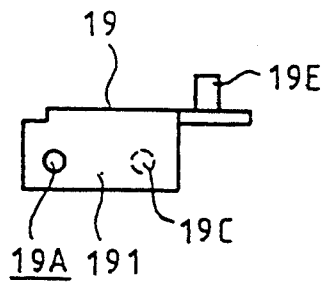
FIG. 10 is a side elevational view taken along the line 10—10 of FIG. 9.

A movable plate-like member 19, which is best illustrated in FIGS. 9 and 10, is fit into the playing deck 200 in such a way to oppose to the bottom member 3 with two perpendicular side panels 191, 192 thereof respectively adjacent to the side plates 14, 15 of the playing deck 200. On each of the side panels 191, 192, a hole 19A or 19B is formed to receive therein the first side rods 25A or 25C. Each of the side panels 191, 192 is disposed between the lateral sides 251, 252 of the cassette holder 25 and the side plates 14, 15 so that the side rods 25A, 25C extend through the holes 19A, 19B first and then penetrate into the first L-shaped slots 14A, 15A. Therefore, by the rotation of the output gear 13, the cassette holder 25 is moved along a direction parallel with the horizontal sections of the second L-shaped slots 14B, 15B by the movement of the second side rod 25B formed on the first lateral side 251 of the cassette holder 25. The action of the cassette holder 25 moves the movable member 19 with the engagement between the first side rods 25A, 25C and the hole 19A, 19B of the movable member 19.

The movable member 19 comprises a pair of side pins 19C, 19D respectively formed on the side panels 191, 192 thereof, extending toward each other to define a pivot axis. The movable member 19 further comprises an elongated slot 19G formed thereon, extending in a direction normal to the pivot axis defined by the side pins 19C, 19D and a pair of top pins 19E, 19F formed on the movable member 19 and symmetrical about the elongated slot 19G.

Figure 7:
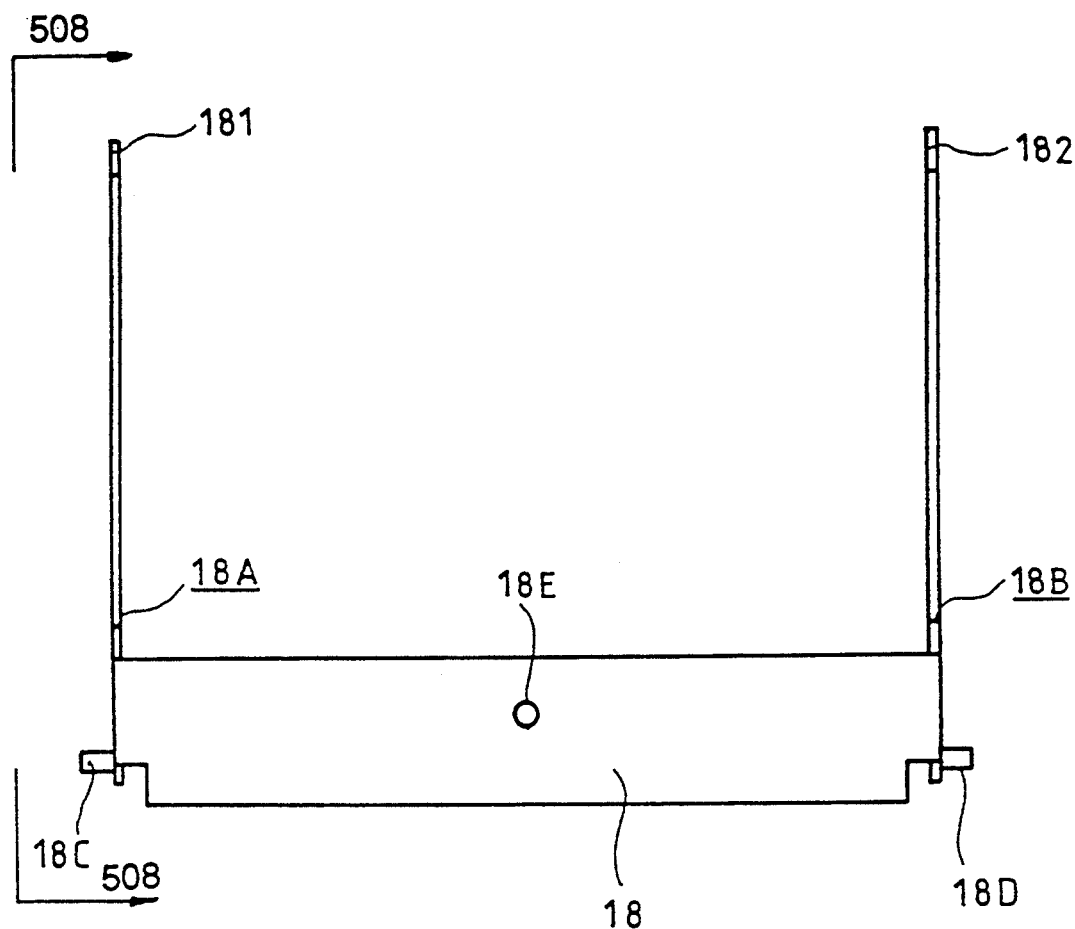
FIG. 7 is a top plan view of the stationary member of the cassette loading mechanism.
Figure 8:
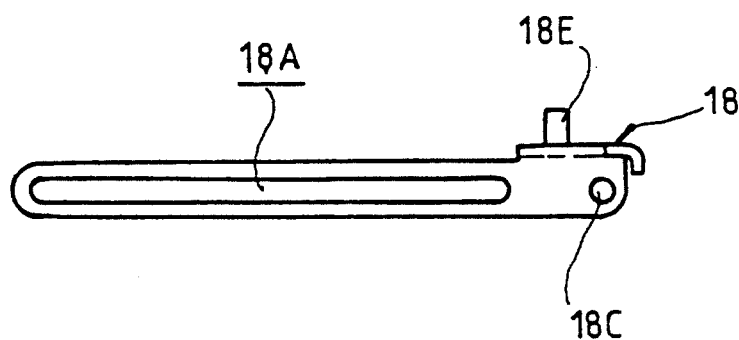
FIG. 8 is a side elevational view taken along the line 8—8 of FIG. 7.

A stationary plate-like member 18, which is best illustrated in FIGS. 7 and 8, is also fit into the playing deck 200 in such a way to oppose the bottom member 3 with a pair of wings 181, 182 thereof adjacent to the side plates 14, 15. The wings 181, 182 are elongated plate-like members, each having an elongated slot 18A or 18B formed thereon. Each of the wings 181, 182 is perpendicularly mounted to the stationary member 18 and extends from a connection with the stationary member 18 in a direction substantially parallel with the stationary member 18.

The wings 181, 182 are interposed between the lateral sides 251, 252 of the cassette holder 25 and the side panels 191, 192 of the movable member 19 such that the first side rods 25A, 25C penetrate the elongated slots 18A, 18B of the stationary member 18, and then extend through the holes 19A, 19B of the movable member 19 to get into the first L-shaped slots 14A, 15B. The side pins 19C, 19D of the movable member 19 also penetrate into the elongated slots 18A, 18B of the wings 181, 182 to be slidable therein.

A first linking bar 16 is connected between the second side rod 25B formed on the first lateral side 251 of the cassette holder 25 and the slot 18A formed on the first wing 181 of the stationary member 18 with a first end thereof pivotally secured by the second side rod 25B and a second end thereof pivotally and movably disposed within the slot 18A. Similarly, a second linking bar 17 is connected between the second side rod 25D formed on the second lateral side 252 of the cassette holder 25 and the slot 18B formed on the second wing 182 of the stationary member 18 in a similar manner. These linking bars 16 and 17 will be further discussed hereinafter.

The movable member 19 and the stationary member 18 are so disposed that they are substantially located at the same plane as can be observed from FIGS. 5, 13, 16 and 19 and a gap is present therebetween to avoid interference between these two members during operation. The side pins 19C, 19D of the movable member 19, together with the engagements of the holes 19A, 19B and the elongated slots 18A, 18B with the side rods 25A, 25B, help maintain the movable member 19 at this plane.

Figure 11:
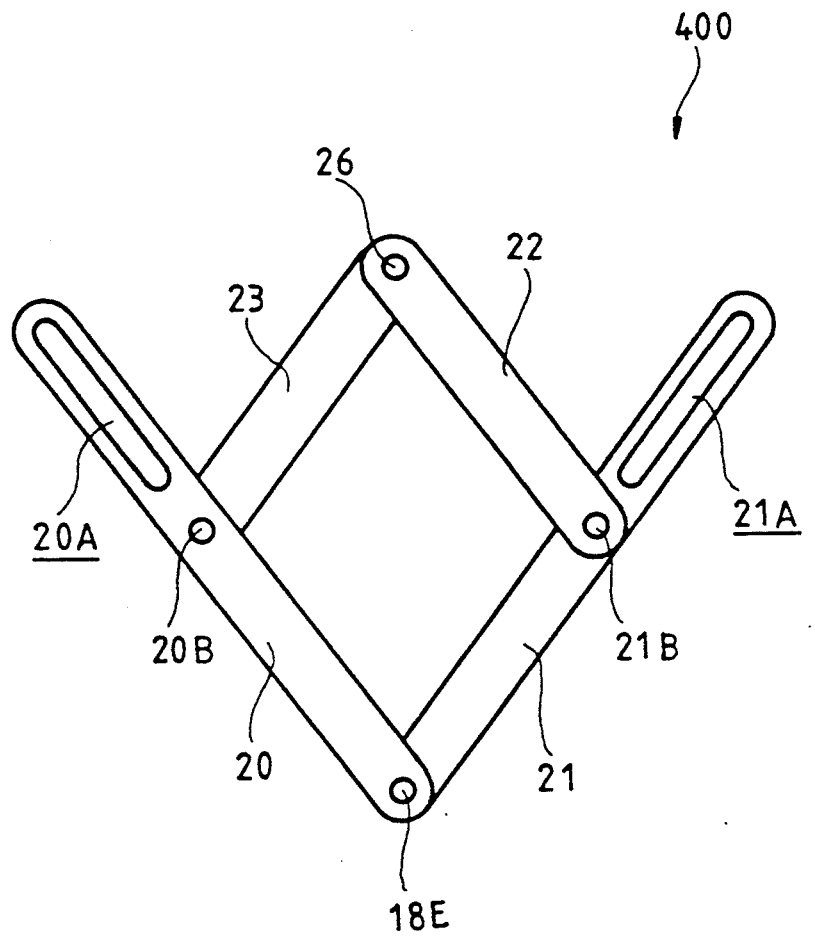
FIG. 11 is a plan view showing a four bar linkage of the cassette loading mechanism.
Figure 12:
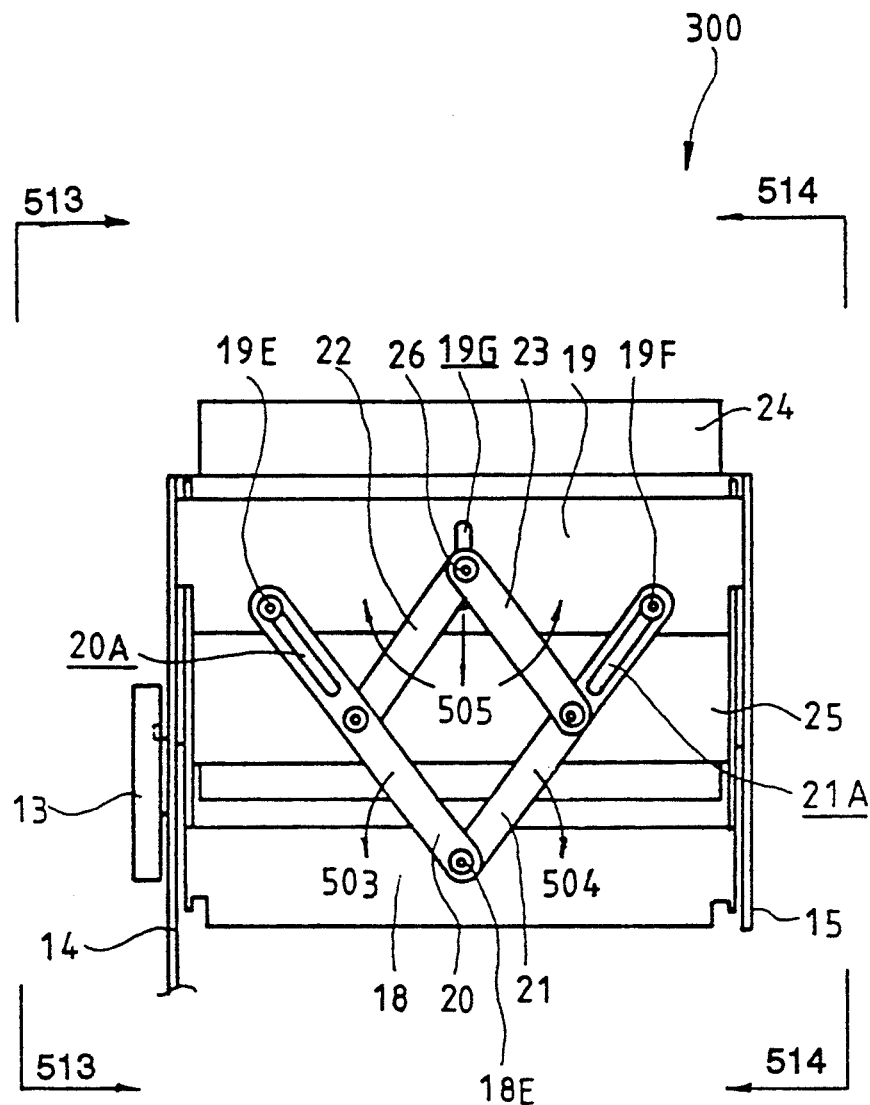
FIG. 12 is a top plan view showing the cassette loading mechanism in the unloading position.
Figure 13:
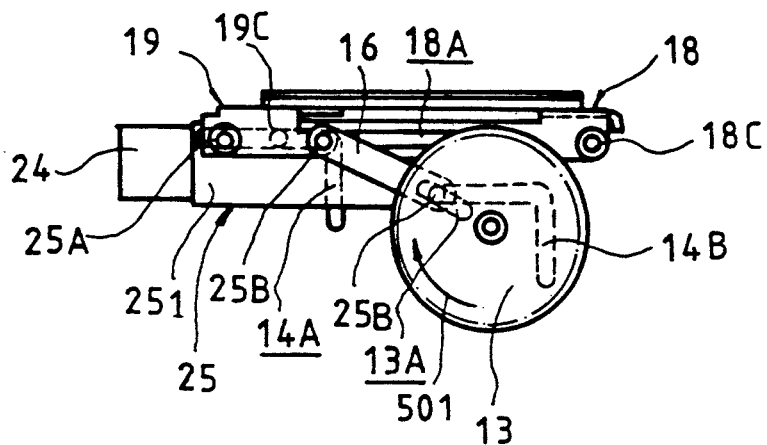
FIG. 13 is a side elevational view taken along the line 13—13 of FIG., 12.
Figure 14:
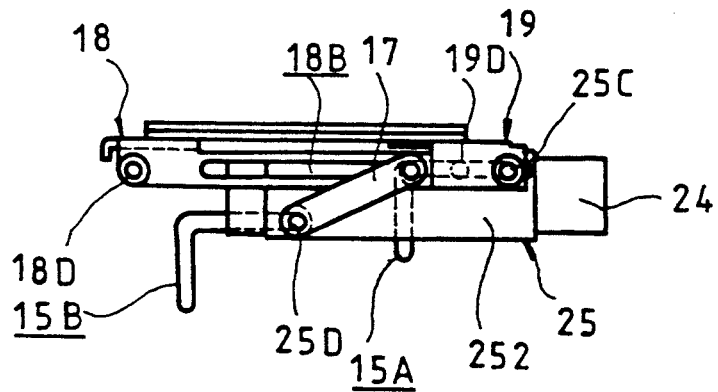
FIG. 14 is a side elevational view taken along the line 14—14 of FIG. 12.

A four bar linkage 400, which is best seen in FIG. 11, is connected between the stationary member 18 and the movable member 19. The four bar linkage 400 comprises a pair of long links 20, 21 and a pair of short links 22, 23 forming a parallelogram structure as shown in the drawings, which ensures a symmetrical motion. The long links 20, 21 are pivoted at a first pivotal point thereof with a pivot pin 18E mounted on the stationary member 18 which pivot pin 18E is substantially opposite to the elongated slot 19G of the movable member 19. The short links 22, 23 are pivoted at a second pivotal point with a pivot pin 26 which partially extends into the elongated slot 19G of the movable member 19 to be guided to move along the slot 19G only. The two short links 22, 23 are respectively pivotally connected to the long links 20, 21 at a third and a fourth pivotal points 20B, 21B to form the above-mentioned parallelogram structure so that when the pivot pin 26 moves along the elongated slot 19G of the movable member 19, the long links 20, 21 are rotated relative to each other.

Each of the long links 20, 21 comprises an extension with an elongated slot 20A or 21A formed thereon to respectively slidably receive therein the top pin 19E, 19F of the movable member 19. The slots 20A, 21A are so formed that when the movable member 19 is moved along the elongated slots 18A, 18B of the wings 181, 182 toward the stationary member 18, the constraints imposed on the slots 20A, 21A by the top pins 19E, 19F force the long links 20, 21 to rotate away from each other and thus moving the pivot pin 26 under the guidance of the slot 19G of the movable member 19 toward the stationary member 18 by the pivotal engagements 20B, 21B between the long links 20, 21 and the short links 22, 23. On the other hand, when the movable member 19 is moved away from the stationary member 18, all members or elements move or rotate in an opposite direction.

The presence of the four bar linkage 400 is to ensure the force or motion applied to one of the lateral sides 251, 252 of the cassette holder 25 can be stably transmitted to the other side and thus making the cassette holder 25 move in a symmetrical, stable way without vibration or jam. This is accomplished by the symmetry thereof. When a force acts upon the first lateral side 251 of the cassette holder 25 to move this lateral side 251, the motion is transmitted to the second top pin 19F via the first top pin 19E and the deformation of the four bar linkage 400 and thus moving the second lateral side 252 of the cassette holder 25 is a symmetrical way.

The rotation of the output gear 13 forces the second side rod 25B of the first lateral side 251 of the cassette holder 25 to move along the second L-shaped slot 14B of the first side plate 14 under the constraint of the slot 13A of the output gear 13. For the purpose of easy to clearly explain the function of the present cassette loading mechanism 300, assuming, without loss of the generality, the current situation of the cassette loading mechanism 300 is that shown in FIGS. 12-14, which is herein referred to as the unloading position. With the rotation of the output gear 13 in a clockwise direction as viewed in FIG. 13 and illustrated therein by the arrow 501, the cassette holder 25 is moved along the arrow 502 by the second side rod 25B. The motion of the cassette holder 25 drives the first side rod 25A to move the movable member 19. And under this situation, the long links 20, 21 are rotated about the pivot 18E in the directions of arrows 503, 504 and thus rotating the short links 22, 23 and moving the pivotal pin 26 along the direction 505.

As previously explained, the motion is symmetrically transmitted to the second lateral side 252 of the cassette holder 25 via the four bar linkage 400. Therefore, the second panel 192 of the movable member 19 is moved in symmetry to the first side panel 191 thereof. The second side panel 192 of the movable member 19 then moves the first side rod 25C formed on the second lateral side 252 of the cassette holder 25 which in turn moves the second lateral side 252 of the cassette holder 25 along the first L-shaped slot 15A formed on the second side plate 15 of the playing deck 200. This provides the second lateral side 252 of the cassette holder 25 with a symmetrical motion with respect to the first lateral side 251 of the cassette holder 25 and thus avoid any instability or jamming so induced in moving the cassette holder with respect the playing deck 200.

Figure 15:
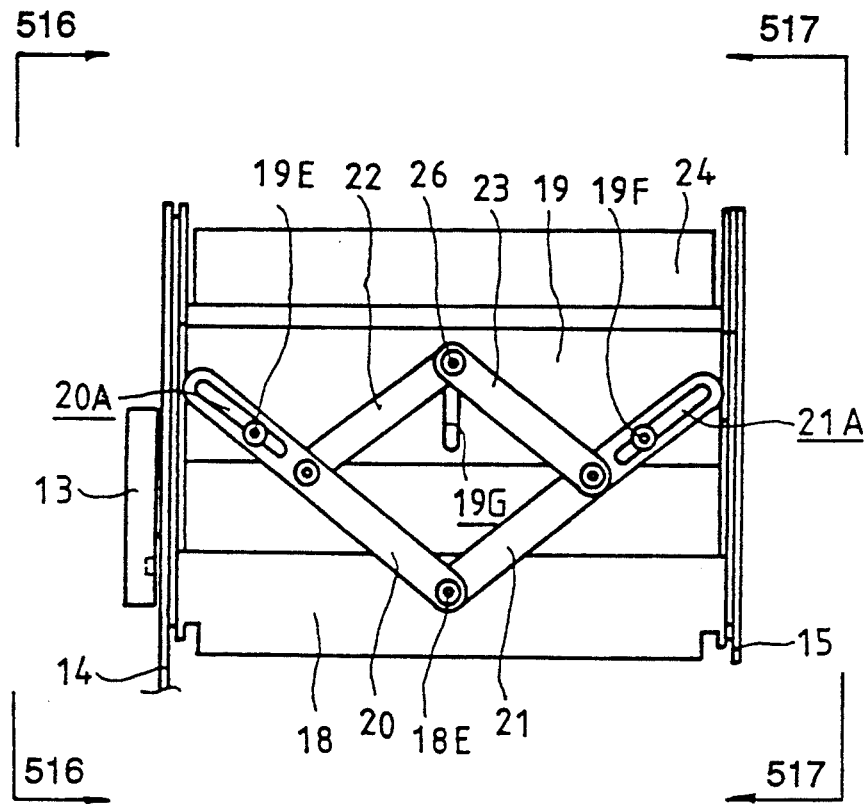
FIG. 15 is a top plan view showing the cassette loading mechanism in the intermediate position.
Figure 16:
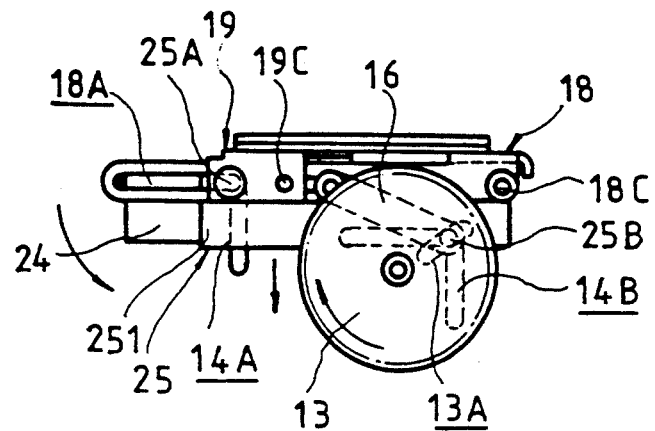
FIG. 16 is a side elevational view taken along the line 16—16 of FIG. 15.
Figure 17:
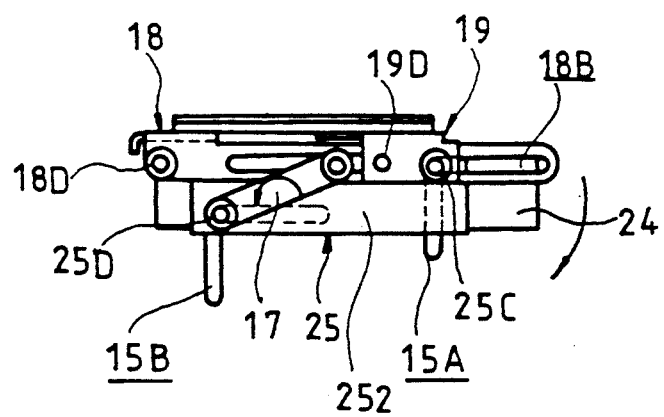
FIG. 17 is a side elevational view taken along the line 17—17 of FIG. 15.
Figure 18:
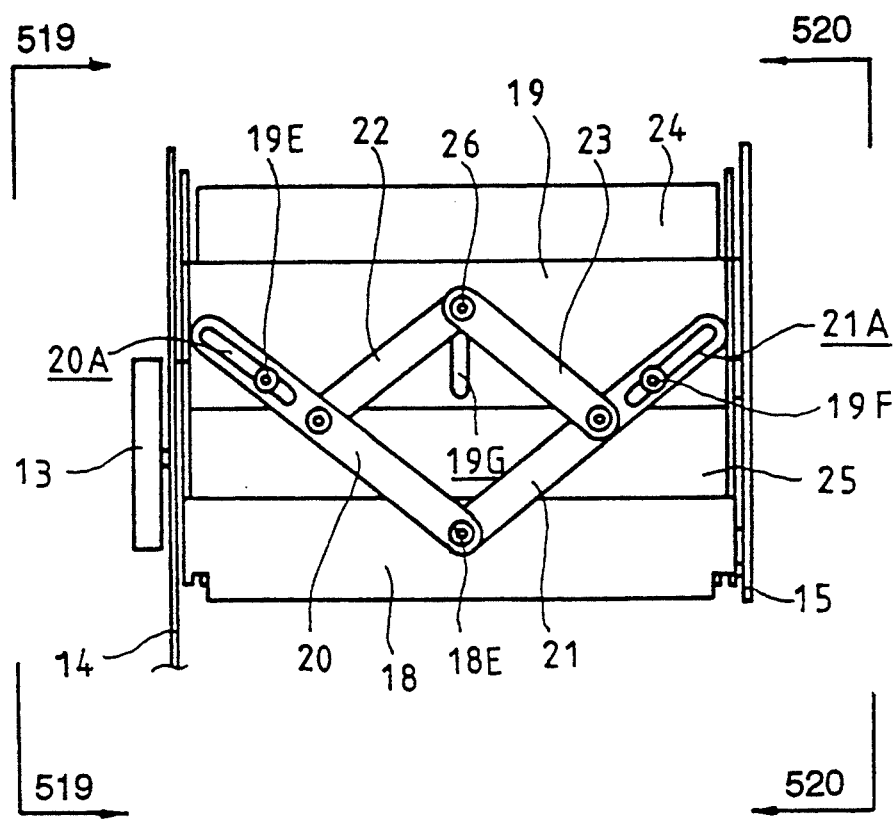
FIG. 18 is a top plan view showing the cassette loading mechanism in the loading position.
Figure 19:
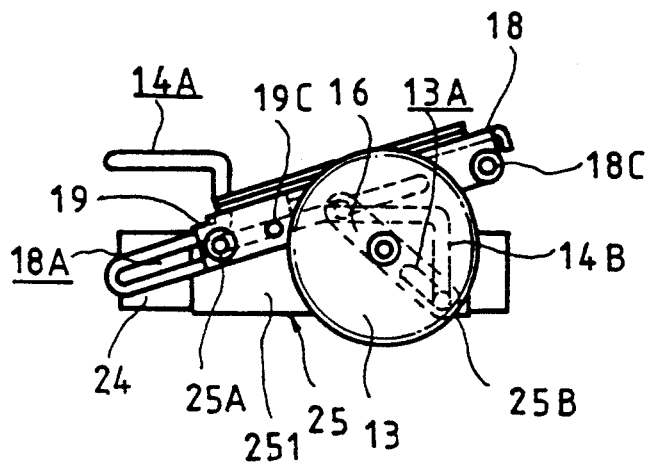
FIG. 19 is a side elevational view taken along the line 19—19 of FIG. 18.
Figure 20:
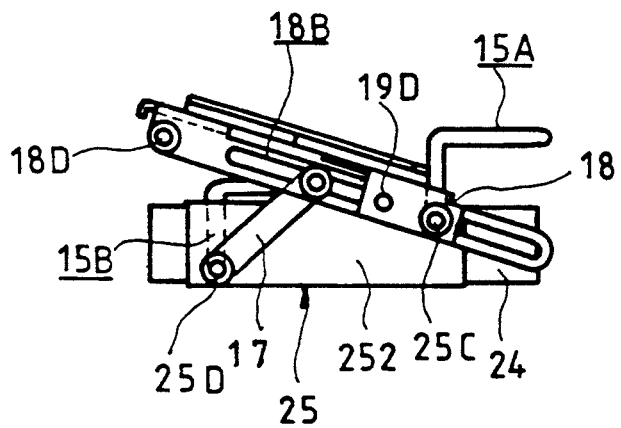
FIG. 20 is a side elevational view taken along the line 20—20 of FIG. 18.

The movement of the cassette holder 25 continues along the horizontal sections of the L-shaped slots 14A, 14B, 15A, 15B to the connections between the horizontal sections and the vertical sections thereof. This situation is shown in FIGS. 15–17 and is herein referred to as the intermediate position.

Once the cassette holder 25 reaches the connection corners of the L-shaped slots 14A, 14B, 15A, 15B, a further rotation of the output gear 13 moves the cassette holder 25 downward along the vertical sections of the L-shaped slots 14A, 14B, 15A, 15B. The downward movement of the second side rod 25B formed on the first lateral side 251 of the cassette holder 25 is transmitted to the first wing 181 of the stationary member 18 via the first linking bar 16 and the engagement between the linking bar 16 and the elongated slot 18A of the first wing 181.

The stationary member 18 comprises a first pivot 18C formed on the first lateral side 181 thereof and a second pivot 18D formed on the second lateral side 182, opposite to the first pivot 18C, together defining a pivot axis. The pivots 18C, 18D are respectively received in a hole 14C formed on the first side plate 14 and a hole 15C formed on the second side plate 15 and thus allowing the cassette holder 25 to be rotatable with respect to the playing deck 200 about the pivot axis extending through the pivots 18C, 18D.

With the arrangement of the pivots 18C, 18D, the downward movement of the cassette holder 25 causes the stationary member 18 to rotate about the pivots 18C, 18D due to the connection between the first wing 181 and the second side rod 25B (or the output gear 13) by the first linking bar 16. The first linking bar 16 pulls the first wing 181 to rotate downward about the pivots 18C, 18D and this makes the first side rod 25A slide down the vertical section of the first L-shaped slot 14A of the first side plate 14. And eventually, the cassette holder 25 is moved downward to reach the position shown in FIGS. 18-20 which is herein referred to as the loading position.

Due to the symmetry of the present cassette loading mechanism 300, the second lateral side 252 of the cassette holder 25 is moved downward in a symmetrical way.

To unload the cassette 24 from the cassette playing apparatus 100, the output gear 13 is rotated in a reversed direction and thus causing the cassette loading mechanism 300 to function in a reversed direction and thus moving the cassette holder 25 from the loading position (shown in FIGS. 18-20) to the intermediate position (shown in FIGS. 15-17) and finally arriving at the unloading position (shown in FIGS. 12-14) to allow the cassette 24 to be manually removed out of the cassette holder 25.

It is apparent that although the invention has been described in connection with a preferred embodiment, those skilled in the art may make changes to certain features of the preferred embodiment without departing from the spirit and scope of the invention as defined in the appended claims.

What is claimed is:

1. A cassette loading mechanism for loading a magnetic recording cassette which is removably disposed within a cassette holder into a cassette playing apparatus which comprises a playing deck having a bottom member with a cassette driving means for driving reel hubs of the cassette on which a magnetic recording medium is wound and signal sensing means which reads a magnetic signal from the magnetic recording medium travelling therethrough, a first side plate and a second side plate substantially perpendicularly mounted on said bottom member to define therebetween a space for receiving therein the cassette holder, each of said side plates defining thereon a first pair of shaped slots and a second pair of shaped slots, both opposite to each other, a mechanical transmission system being provided to transmit torque from a torque source to said cassette loading mechanism, said mechanical transmission system comprising at least a gear rotatably mounted on said first side plate with a radial slot formed on a web thereof, said cassette loading mechanism comprising:

a movable member which is a plate-like member fit into said playing deck in such a way to oppose the bottom member with a first side panel and a second side panel thereof respectively adjacent to said first side plate and said second side plate in such a way to be movable relative to said first and second side plates, said side panels being substantially normal to said movable member, each of said side panels comprising a hole formed thereon, directly opposite to each other, each of said side panels further comprising a side pin formed thereon, directly opposing each other, said movable member further comprising an elongated slot extending normal to an axis running through said side pins of the side panels thereof and located substantially midway between the side panels thereof, a pair of top pins being formed on said movable member in symmetry with respect to said elongated slot;

a stationary member which is a plate-like member fit into said playing deck in such a way to define a gap with said movable member and has a first wing and a second wing thereof respectively fit over said first side plate and said second side plate in such a way to be movable relative to said first and second side plates, said wings being substantially perpendicular to said stationary member and extending in a direction parallel with said stationary member and each said wings having a slot formed thereon, each of said wings further comprising a side pivot pin formed thereon opposite-to each other, a top pivot pin being formed on said stationary member substantially midway between said wings;

said cassette holder comprising a first lateral side and a second lateral side on each of which a first side rod and a second side rod are formed respectively opposite to each other, said first side rods respectively extending through the slots formed on the wings of said stationary member and then penetrating through the holes formed on the side panels of said movable member and eventually received in said first shaped slots formed on said side plates, the side pins of said movable member being received in the slots of said wings to maintain said movable member at substantially the same plane with said stationary member, said second side rods extending through the slots of the wings of said stationary and then penetrating through the second shaped slots, the second side rod of the first lateral side further extending into the radial slot of said gear so that when said gear rotates, the second side rod of said first lateral side of the cassette holder is driven by said radial slot to move within the second shaped slot formed on said first side plate;

said first side plate comprising a hole formed thereon to rotatably receive therein the first side pivot pin of said stationary member and said second side plate comprising a hole formed thereon to rotatably receive therein the second side pivot pin of said stationary member to allow said stationary member to be rotatable with respect to said playing deck about a pivot axis defined by said side pivot pins;

a four bar linkage, which is disposed between said movable member and said stationary member, comprising two long links pivotally connected at a first pivot point with the top pivot pin of said stationary member and two short links pivotally connected at a second pivot point with a pivot, said pivot being partially received in the elongated slot formed on said movable member to be guided thereby, the two short links being pivotally connected to the two long links at a third and a fourth pivot points to form a parallelogram structure, each of the long links comprising a slot to receive therein and guide one of the top pins of said movable member so that when said cassette holder is moved at the first lateral side thereof, the movement is substantially transmitted to the second lateral side thereof by said four bar linkage; and a first linking bar connected between the second side rod of said first side plate and the slot formed on the first wing of said stationary member, and a second linking bar connected between the second side rod of said second side plate and the slot formed on the second wing of said stationary member, each of said linking bar having a first end pivotally secured by one of said second side rods and a second end rotatably and movably received in one of the slots of said wings.

2. A cassette loading mechanism as claimed in claim 1, wherein said shaped slots formed on the side plates of said playing deck are L-shaped slots, each having a horizontal section and a vertical section with a connection corner formed therebetween so that when said gear rotates to drive the second side rod formed on the first lateral side of said cassette holder to move along the horizontal section of the second L-shaped slot of the first side plate toward the connection corners and then changing direction to slide down the vertical section of the second L-shaped slot of the first side plate, the first linking bar pulls the first side rod formed on the first lateral side of said cassette holder to move downward along the vertical section of the first L-shaped slot formed on the first side plate of said playing deck.

* * * * *